United States Patent
Geissler et al.

(10) Patent No.: US 10,837,467 B2
(45) Date of Patent: Nov. 17, 2020

(54) HYDRAULIC APPARATUS, IN PARTICULAR HYDRAULIC VALVE OR HYDRAULIC REGULATOR

(71) Applicant: Liebherr Machines Bulle SA, Bulle (CH)

(72) Inventors: Lennard Geissler, Fürstenau (DE); Patrick Wohlhauser, Giffers (CH)

(73) Assignee: LIEBHERR MACHINES BULLE SA, Bulle (CH)

( * ) Notice: Subject to any disclaimer, the term of this patent is extended or adjusted under 35 U.S.C. 154(b) by 49 days.

(21) Appl. No.: 16/046,379

(22) Filed: Jul. 26, 2018

(65) Prior Publication Data

US 2019/0032681 A1    Jan. 31, 2019

(30) Foreign Application Priority Data

Jul. 27, 2017 (CH) .......................... 979/17

(51) Int. Cl.

| F15B 13/04 | (2006.01) |
|---|---|
| F15B 13/02 | (2006.01) |
| F04B 49/22 | (2006.01) |
| F04B 49/08 | (2006.01) |
| F16K 17/04 | (2006.01) |

(Continued)

(52) U.S. Cl.
CPC .......... *F15B 13/0402* (2013.01); *F04B 49/00* (2013.01); *F04B 49/08* (2013.01); *F04B 49/22* (2013.01); *F04B 53/10* (2013.01); *F15B 13/024* (2013.01); *F15B 13/0417* (2013.01); *F16F 1/121* (2013.01); *F16K 17/0473* (2013.01); *F16K 17/06* (2013.01); *F15B 13/14* (2013.01);

(Continued)

(58) Field of Classification Search
CPC .. F16K 37/0008; F16K 37/0058; F16K 17/06; F16H 25/08; F16H 2025/2043; G05G 1/015; G05G 5/02; G05G 5/03; G05G 5/16; F16B 39/22; F16B 39/28; F16B 39/282; F16B 39/34; F15B 13/0402; F15B 13/024; F15B 13/0417; F15B 2211/40515; F15B 2211/422; F15B 2211/522; F15B 2211/528; F15B 2211/55; F15B 2211/555; F15B 2211/513; F15B 13/14; F15B 13/16; Y10T 137/7878; Y10T 137/8225; F04B 49/00; F04B 49/08; F04B 49/22
USPC .................................................. 411/190, 195
See application file for complete search history.

(56) References Cited

U.S. PATENT DOCUMENTS

| 4,072,442 A * | 2/1978 | Horiuchi ................. F04B 49/08 417/218 |
| 4,116,577 A * | 9/1978 | Lauck ...................... B62D 5/07 417/286 |

(Continued)

*Primary Examiner* — Seth W. Mackay-Smith
(74) *Attorney, Agent, or Firm* — McCoy Russell LLP

(57) ABSTRACT

The present invention relates to a hydraulic apparatus, in particular to a hydraulic valve or to a hydraulic regulator, having a housing, at least one piston axially displaceably supported in a housing bore, and a respective at least one compression spring acting on the at least one piston, wherein at least one externally accessible regulating screw is adjustable within the housing bore to set the preload of the compression spring in the axial direction, wherein the adjustment distance of the at least one regulating screw is divided into at least two adjustment ranges and the torque to be applied for the adjustment of the regulating screw is larger in a second adjustment range than in a first adjustment range.

17 Claims, 10 Drawing Sheets

(51) Int. Cl.
*F16K 17/06* (2006.01)
*F16F 1/12* (2006.01)
*F04B 53/10* (2006.01)
*F04B 49/00* (2006.01)
*F15B 13/14* (2006.01)

(52) U.S. Cl.
CPC ............... *F15B 2211/40515* (2013.01); *F15B 2211/422* (2013.01); *F15B 2211/522* (2013.01)

(56) References Cited

U.S. PATENT DOCUMENTS

| | | | | |
|---|---|---|---|---|
| RE30,828 E | * | 12/1981 | Budzich | F15B 11/165 137/596.13 |
| 4,355,761 A | * | 10/1982 | Bjorn | B05B 9/0403 200/81.9 R |
| 4,649,727 A | * | 3/1987 | Gray | B21J 15/022 29/240 |
| 4,682,520 A | * | 7/1987 | Gray | B25B 13/06 411/1 |
| 4,877,296 A | * | 10/1989 | Leiber | B60T 8/4225 303/113.4 |
| 4,890,891 A | * | 1/1990 | Leiber | B60T 8/344 303/113.4 |
| 4,904,029 A | * | 2/1990 | Leiber | B60T 8/4018 303/115.4 |
| 4,948,200 A | * | 8/1990 | Leiber | B60T 8/4018 303/113.3 |
| 5,562,424 A | * | 10/1996 | Manring | F04B 49/08 417/222.1 |
| 5,918,371 A | * | 7/1999 | Herrmann | B25B 7/12 30/246 |
| 6,539,712 B2 | * | 4/2003 | Konishi | E02F 9/226 60/460 |
| 6,644,169 B2 | * | 11/2003 | Deininger | B66F 9/22 137/596.17 |
| 6,868,863 B2 | * | 3/2005 | Hansen | F15B 13/0402 137/505 |
| 7,044,442 B2 | * | 5/2006 | Belser | F04B 49/002 251/176 |
| 7,104,283 B2 | * | 9/2006 | Ino | F15B 13/0402 137/625.65 |
| 8,418,723 B2 | * | 4/2013 | Tsuchiya | B62D 5/062 137/625.65 |
| 9,103,459 B2 | * | 8/2015 | Borchgrevink | F16K 37/0008 |
| 2008/0050199 A1 | * | 2/2008 | Park | F16B 4/004 411/402 |
| 2011/0240126 A1 | * | 10/2011 | Lymberopoulos | F16K 31/1262 137/1 |
| 2012/0025114 A1 | * | 2/2012 | Lymberopoulos | F16K 31/1262 251/12 |

\* cited by examiner

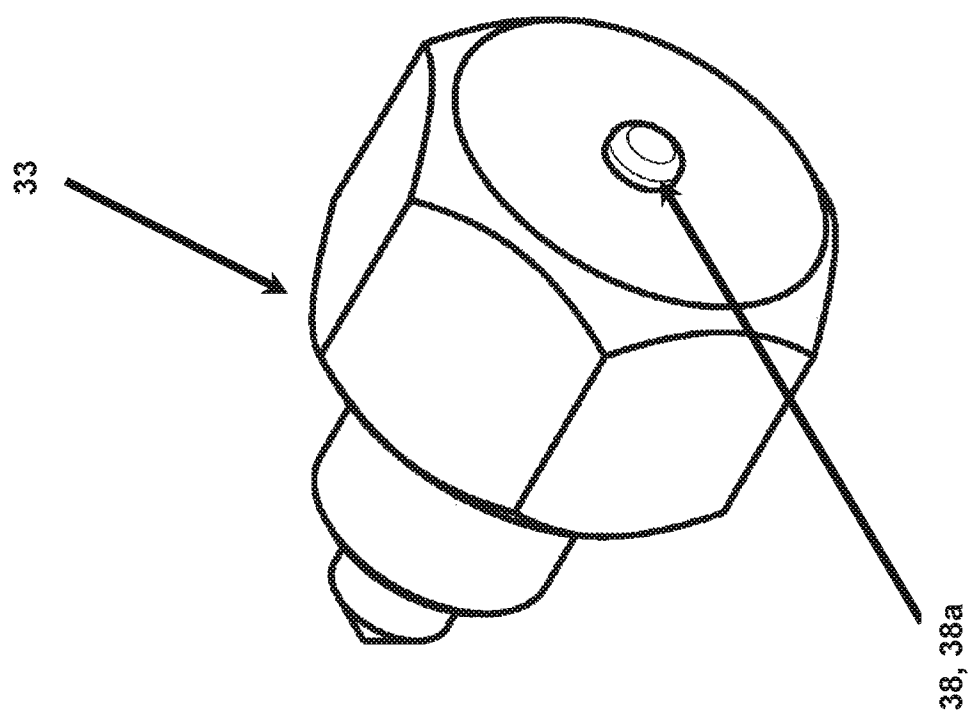
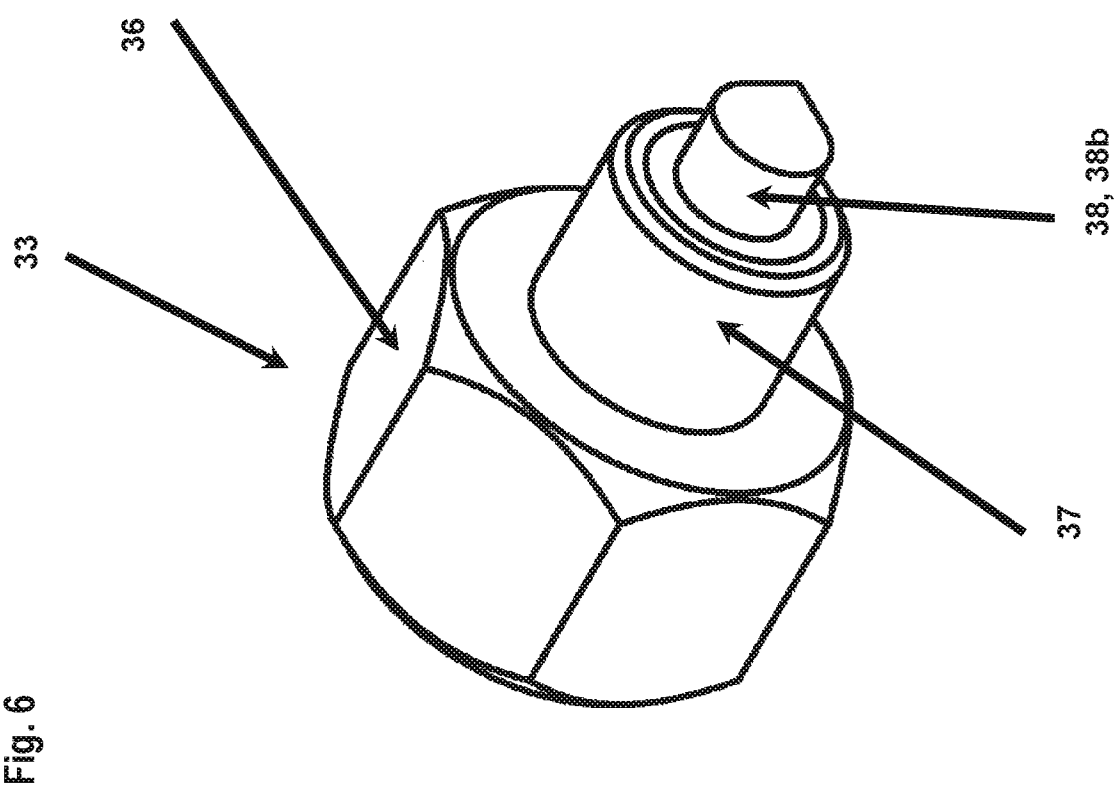
Fig. 6

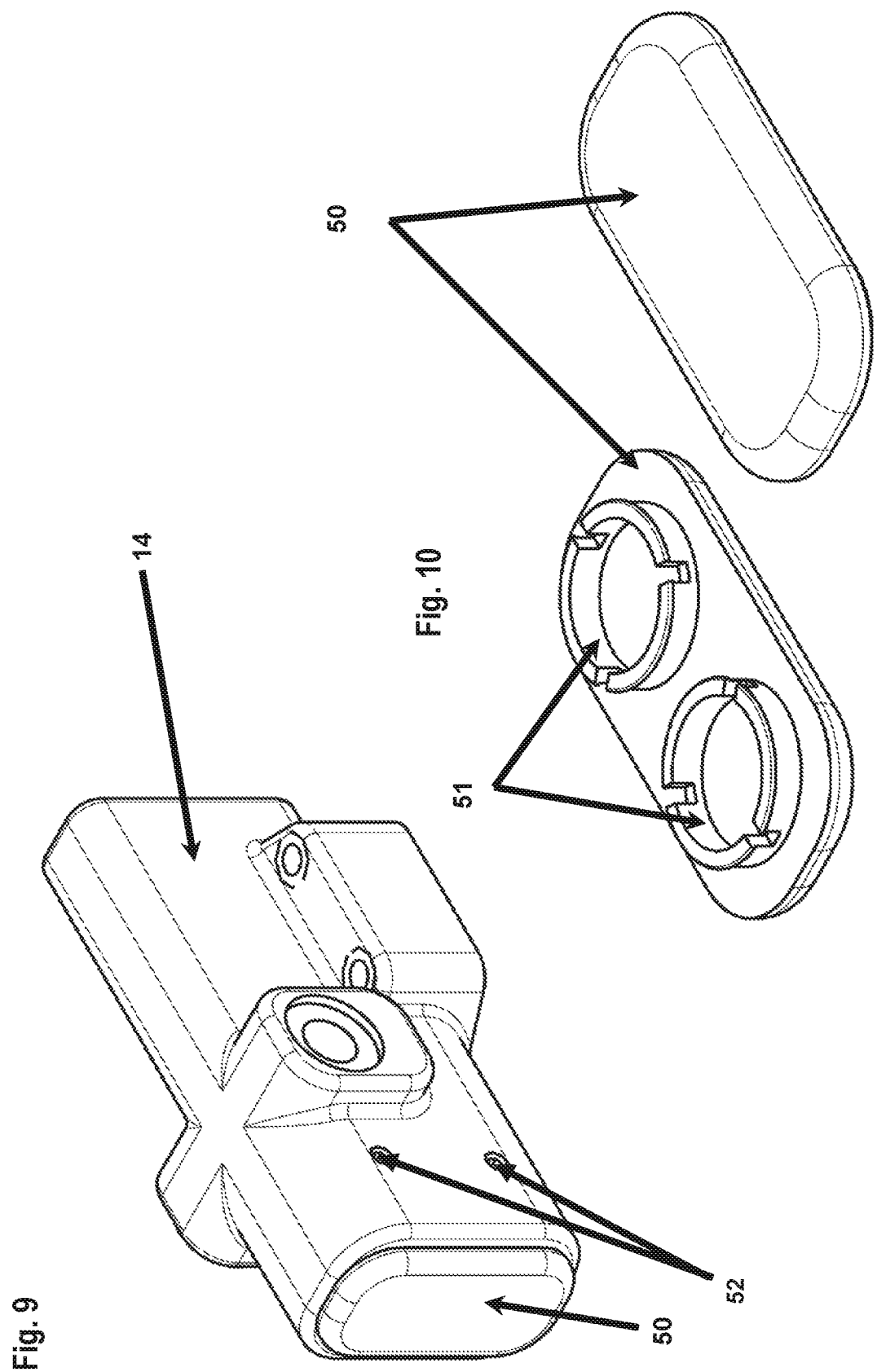

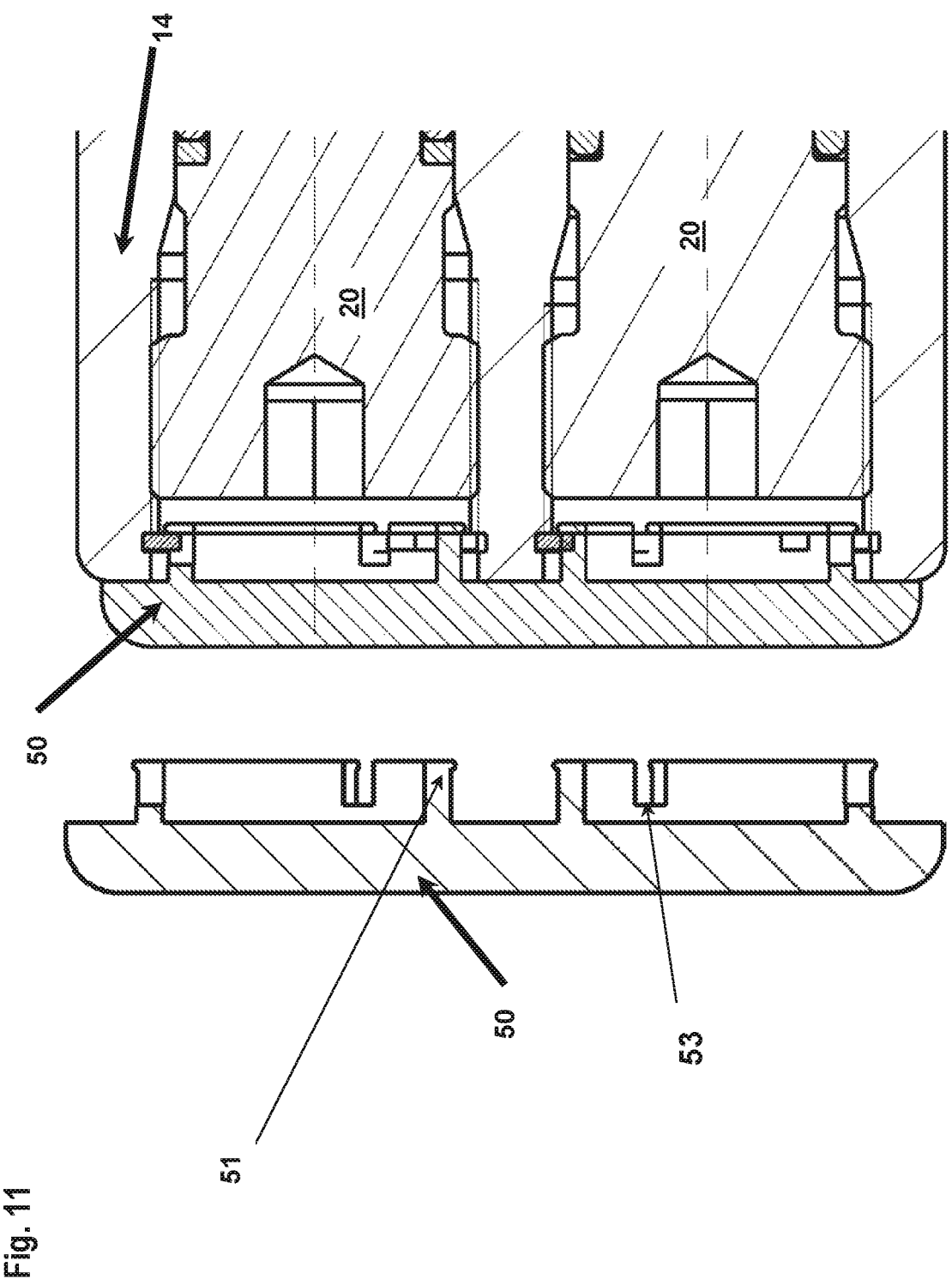

HYDRAULIC APPARATUS, IN PARTICULAR HYDRAULIC VALVE OR HYDRAULIC REGULATOR

This application claims priority to Swiss Patent Application No. 00979/17 entitled "HYDRAULISCHE VORRICHTUNG, INSBESONDERE HYDRAULIKVENTIL ODER HYDRAULIKREGLER," filed Jul. 27, 2017, the entire contents of which is hereby incorporated by reference in its entirety for all purposes.

TECHNICAL FIELD

The invention relates to a hydraulic apparatus, in particular to a hydraulic valve or to a hydraulic regulator, having a housing, at least one piston axially displaceably supported in a housing bore, and a respective at least one compression spring acting on the at least one control spool, wherein at least one externally accessible regulating screw is adjustable within the housing bore to set the preload of the compression spring in the axial direction.

BACKGROUND AND SUMMARY

In the following explanation, the term common in this area of control spool is used instead of the generalized term piston in the text passages in which the laying open of the invention relates to the application of the invention features to hydraulic regulators. The term common in this area of valve spool is used instead of the generalized term piston in the text passages in which the laying open of the invention relates to the application of the invention features to hydraulic valves. The term piston is still used in the text parts worded in general terms.

The invention features can be applied to all the different categories of hydraulic regulators, e.g. pressure regulators, power regulators, flow control valves, etc. and to all the different categories of hydraulic valves, e.g. pressure relief valves, proportional valves, etc. To clarify the general applicability of the invention features, the content already included in the preceding sentence should be emphasized that the invention features can be used with respect to hydraulic regulators and hydraulic valves independently of whether the hydraulic apparatus has additional control inputs or not. The term control input should here be understood as an additional possibility of intervention to impart a further force effect on the piston axially displaceably supported in a housing bore. It could e.g. be an additional oil connection to a further control surface of the piston, an actuator (for example, a proportional magnet) with which an action of force can equally be exerted on the piston, etc.

A pressure regulator can be used to operate a hydraulic displacement unit, for example a hydraulic pump. If the pressure regulator has an additional control input, the oil pressure present at the high pressure output of the hydraulic pump can be regulated to a specific level in dependence on the control signal supplied via said control input; naturally under the condition that sufficient mechanical power can be supplied to the hydraulic pump. The pressure level must exceed a minimum value to maintain an oil leakage required for the self-lubrication of the hydraulic pump or of the hydraulic system. At the same time, the pressure level at the high pressure output of the hydraulic pump has to be limited to an upper value to avoid its overload or that of the components of the hydraulic system. This observation of a limitation of the pressure range at both sides—frequently called a bilateral pressure cut-off—is likewise required for a hydraulic motor working in pump operation. In practical use, this mode of operation is, for example, present in braking operation of a hydraulic traction drive or on the lowering of a load by a hoisting winch actuated by a hydraulic motor.

The lower and upper limit pressures can be fixed with respect to the example of a pressure-regulated hydraulic pump by changing the preload of the compression spring via a regulating screw accessible from the outside. A pressure regulation is then possible within the bandwidth between these limit pressures. Provided that the hydraulic pump can be supplied with sufficient mechanical power, the pressure level at the high pressure output of the hydraulic pump does not fall beneath the lower limit pressure. An exceeding of the upper limit pressure is not possible.

There is, however, a problem with these regulating screws that the user as a rule can only estimate which preload is currently set with difficulty. Experienced engineers can estimate the set preload with reference to the screw-in depth of the regulating screw. The maximum value of the settable preload is defined by a hard abutment of the regulating screw in practice and is accordingly fixedly predefined by the production. The definition of this maximum value takes place in dependence on a maximum permitted system pressure in the connected hydraulic system depending on the application as a rule. The permitted maximum system pressure corresponds to that pressure level at which a permanent operation of the system is ensured without overloading individual components.

In practice, for instance for test purposes, there is, however, in many cases a wish briefly to use the hydraulic system or the regulated hydraulic pump or the regulated hydraulic motor in a controlled overload range, i.e., where necessary, the hydraulic regulator should permit a higher preload of the compression spring acting on the control spool and thus a higher limit value. A permanent operation of the hydraulic system should, however, also be avoided in this controlled overload range since there is otherwise the risk of damage to individual components. Previous regulators neither provide a truly controlled overload range nor do they have technical possibilities to signalize different adjustment ranges to the user at all. The same applies to hydraulic valves.

It is now the object of the present invention, on the one hand, to simplify the handling of the regulating screw or the configuration of the resulting preload of the at least one compression spring acting on the piston and simultaneously to make possible a system having a better fine tuning.

This object is achieved by a hydraulic apparatus in accordance with the features of claim 1. Preferred embodiments of the apparatus are the subject of the dependent claims. The object is furthermore likewise achieved by a hydraulic apparatus in accordance with the features of claim 10. Advantageous embodiments of this apparatus are also the subject matter of the dependent claims here.

In accordance with a first aspect of the invention, an apparatus of the category is modified in that the actuating distance of the at least one regulating screw is divided into at least two adjustment ranges. The two adjustment ranges differ from one another in that the torque to be applied there is different for the actuation of the regulating screw. This change of the torque to be applied is preferably caused solely by friction caused between the regulating screw and the housing bore; an influence by the change, i.e. of an increase or decrease of the preload of the compression spring is of absolutely secondary importance.

An adjustment range is understood as a screw-in depth corridor of the regulating screw that extends from a defined lower screw-in depth up to a defined upper screw-in depth. A further adjustment range adjoining the former then extends, for example, from this upper screw-in depth up to an upper screw-in depth disposed lower in the housing bore, i.e. a first adjustment range extends here over any desired corridor with an increasing screw-in depth, while a second adjustment range adjoins it over any desired corridor with a larger screw-in depth. In other words, a first adjustment range extends with respect to an already installed and thus operational hydraulic apparatus from a first screw rotation up to any desired number of screw rotations of the regulating screw. From a specific number of screw rotations onward, the regulating screw enters into a subsequent adjustment range with a larger screw-in depth.

What is important here is that the torque to be applied for a change of the screw-in depth in a second adjustment range is noticeably greater than in a first adjustment range. Noticeable means clearly perceptible at this point for the trained engineer on a manual actuation of the regulating screw.

As has already been mentioned above, the apparatus can preferably be a hydraulic valve or a hydraulic regulator. A plurality of valve elements or regulator axles can be accommodated in a common housing here. A valve element is here understood as the arrangement of an adjustment gate valve having at least one compression spring; a regulator axle comprises a control spool and at least one compression spring. In such hydraulic apparatus in whose housings a plurality of valve elements/regulator axles are installed, the valve elements/regulator axles, e.g. the housing bores or regulating screws, etc., do not necessarily have to be identical, but can instead differ from one another in one or more features, either a combination of different embodiments in accordance with the invention or a combination of embodiments in accordance with the invention with aspects that already correspond to the prior art, e.g. a twin housing that accommodates a load sensing regulator in accordance with the invention and a main stage corresponding to the prior art.

The technical sophistication of the invention makes it possible to signal the transition into a further adjustment range to the engineer by a haptic feedback in the form of the noticeable torque difference on the actuation of the regulating screw.

The application of these invention features for the example of the pressure cut off of a hydraulic pump provides that two different setting ranges are present for the setting of the maximum pressure that can occur at the high pressure output of the hydraulic pump. If the hydraulic system, i.e. the hydraulic pump, the regulators and valves used, and the hydraulic consumers, etc. are adapted to one another, the setting within the first adjustment range has the effect that said maximum pressure is within the permitted regular pressure range in which the hydraulic system can be permanently operated, whereas the setting within the second range enables an operation of the hydraulic system in a temporarily permitted overload range. To signal the adjustment range present to the engineer on the actuation of the regulating screw, the torque to be applied in the second range is noticeably higher.

An application for any desired hydraulic valves for which clearly separate setting ranges are desired is equally advantageous, for example in a pressure relief valve. The second adjustment range in which a noticeably higher torque has to be applied for the actuation of the regulating screw could here, for example, cover a pressurized range in which the hydraulic system including the hydraulic apparatus may be temporarily operated. Which corridor of the pressure relief the position of the regulating screw corresponds to or whether the level of the valve opening pressure defined by the preload of the compression spring is in the regular pressure range or in the temporarily permitted pressurized range can thus be clearly signaled to the trained engineer by the noticeable change of the torque.

In accordance with a possible embodiment of the invention, a first adjustment range is defined by the movement of a first sliding surface of the regulating screw along a first longitudinal section of the housing bore, whereas at least one further adjustment range is defined by the movement of a second sliding surface of the regulating screw along a second longitudinal section of the housing bore. In accordance with a preferred embodiment, the first adjustment range can, for example, be defined by the movement of a sliding surface of the regulating screw along a first longitudinal section of the housing bore, whereas a second adjustment range is defined by the movement of the same sliding surface along a second longitudinal section of the housing bore differing from the first longitudinal section. Any desired number of different adjustment ranges can generally be provided.

The torque to be applied is in particular determined by the mechanical friction between the regulating screw and the housing bore, preferably by the mechanical friction between the respective active sliding surface of the regulating screw and the respective longitudinal section of the housing bore. In an advantageous embodiment of the invention, the torque to be applied to actuate the regulating screw is higher in an adjustment range that requires a greater screw-in depth of the adjustment screw or respectively produces a higher preload of the at least one compression spring acting on the piston.

Such different torques to be applied can be achieved in accordance with an advantageous embodiment by different bore diameters for different longitudinal sections of the housing bore. It is expedient here if the sliding surface of the regulating screw in the first adjustment range slides almost free of friction along the first longitudinal section and if the torque to be applied for the actuation of the regulating screw in this adjustment range is preferably only produced by the frictional forces at the threaded connection between the housing bore and the regulating screw. A corresponding seal element of the regulating screw can furthermore also have an influence on the torque to be applied. Other components such as possible washers in the region of the regulating screw can furthermore have an influence on the torque. What is important, however, is that no noticeable frictional force is present on a movement of the regulating screw in the corridor with the smallest screw-in depth between the sliding surfaces acting within the first adjustment range.

In contrast, the frictional force in the second adjustment range increases due to the diameter tapering of the housing bore in this adjustment range. A press fit in particular arises between the sliding surface of the regulating screw and the housing bore of the second longitudinal section, whereby an increase of the torque to be applied is achieved that is noticeable for the engineer.

In addition, at least one adjustment range, in particular the second adjustment range, can be equipped with an abutment at the end side at which the corresponding counter-abutment surface of the regulating screw abuts at a corresponding screw-in depth in the housing and which limits the achievable screw-in depth in an exactly defined manner. A corresponding abutment can, for example, be achieved by a shoulder-like diameter tapering of the housing bore in this region.

An abutment formed as a step-like shoulder produces a load on the regulating screw and on the housing bore that is over a smaller area and is thus locally very high so that it can be meaningful in accordance with an advantageous embodiment if the inner diameter tapering causing the abutment extends conically. Ideally a counter-abutment surface of the regulating screw having the same conicity and matched thereto with an exact fit is provided around the abutment surface between the housing bore and the regulating screw, which avoids a very high load at one point. The load is instead distributed over comparatively large surface regions of the regulating screw and of the housing bore, which considerably reduces the wear at the active surfaces.

Provision can furthermore be made that the regulating screw used is directly screwable to a threaded bore of the housing, i.e. with an internal thread directly introduced into the wall of the housing bore. The regulating screw can furthermore simultaneously form a closure system toward the outside to seal the spring chamber that accommodates the at least one compression spring acting on the piston so that the basic structure of the apparatus is simplified with respect to the known designs of the prior art.

As already described in the introduction, the object of the present invention comprises simplifying the handling of the regulating screw or the setting with an exact fit of the resulting preload on the at least one compression spring acting on the piston. This object is also satisfied in that the apparatus of the category is provided with at least one regulating screw that is characterized by at least one non-cylindrical jacket section. At least one pin displaceably supported perpendicular to the axial direction of the regulating screw lies at this jacket section. There is thereby a positional dependence of the contact point of the pin on the screw-in depth of the regulating screw. The positional dependence is restricted to the axial direction of the pin perpendicular to the axial direction of the regulating screw. This jacket section surface of the regulating screw is preferably conical. The position of the pin accordingly serves as an optical and/or haptic indicator for the resulting preload, set by means of the regulating screw, of the at least one compression spring acting on the piston of the apparatus. It is expedient in this connection if the pin projects out of the housing of the apparatus through a corresponding opening so that said pin is visible from the outside. If an installation situation of the hydraulic apparatus (e.g. a regulator) is present in the higher ranking system or in a mobile work machine in which the pin is not visible, said pin's axial position can be recognized by manual touch.

It is particularly preferred if the pin is supported in a spring-loaded manner at the housing of the apparatus and is pressed onto the conical jacket section surface by the applied preload of a pin compression spring. The pin can be directly supported at the housing of the apparatus. An indirect support by means of a bolt and nut screwable into the housing of the apparatus is, however, also conceivable so that the support of the pin takes place within the bolt and nut that can be screwed by a matching screw thread to a bore of the housing of the apparatus provided for this purpose.

An opening through which the pin passes visibly and/or touchably from the outside can be provided at the front-face end of the bolt and nut or of the housing. Depending on the position of the regulating screw, the pin can either exit the housing or the bolt and nut, can disappear in this opening, or can end flush with the opening margin. The dimensioning and the support of the pin are ideally set such that on the achievement of the desired resulting preload of the at least one compression spring of the piston, the pin terminates in a planar manner with the end face of the bolt and nut or in a planar manner with the opening of the bore of the housing.

The pin can furthermore also be in two parts, with both partial pins being coupled to one another via a hydraulic or pneumatic translation. A translation of the regulating distance of the regulating screw to a pin movement can thereby take place. The regulating pin contacting the regulating screw particularly preferably has a greater control surface than the visible pin exiting the housing or the bolt and nut. The visible pin is further preferably supported at the housing or at the bolt and nut in a spring loaded manner. A comparatively small axial movement of the regulating screw and a correspondingly small movement of the regulating pin is translated by this proposed embodiment into a clearly visible and/or touchable larger movement of the visible pin.

Finally, provision can be made that the pin, in particular the visible pin, is designed with a mechanical latch-in function so that the visible pin latches into the corresponding latch position on the exceeding of a corresponding position. It is ideally an irreversible latching function so that, on the exceeding of a corresponding level of the resulting preload of the at least one compression spring of the piston, the pin remains in this position and a corresponding signal to the user is ensured independent of the time.

The discussed aspect of the optical and/or haptic indicator in accordance with the invention for displaying the set preload of the compression spring can easily be integrated into the apparatus in accordance with the invention having the at least two adjustment ranges or having the advantageous embodiments accompanying them.

It also applies to the invention in accordance with claim 10 and to its advantageous embodiments that this apparatus can preferably be a hydraulic valve or a hydraulic regulator. A plurality of valve elements or regulator axles can be accommodated in a common housing here. A valve element is here understood as the arrangement of an adjustment gate valve having at least one compression spring; a regulator axle comprises a control spool and at least one corresponding compression spring. On the use of the optical and haptic indicators in such hydraulic apparatus in whose housings a plurality of valve elements/regulator axles are installed, they do not necessarily have to be identical, but can rather be equipped with different embodiments of the visual and haptic indicator. It is also conceivable that only some of the provided valve elements/regulator axles are equipped with a corresponding indicator.

Further advantages and properties of the invention will be explained in more detail with reference to an embodiment shown in the Figures. There are shown:

BRIEF DESCRIPTION OF THE FIGURES

FIG. 6 shows detailed views of the optical and haptic monitoring component.

FIG. 9 shows a perspective view of the hydraulic regulator in accordance with the invention in accordance with FIG. 1 with an optionally installed protective cap.

FIG. 10 shows detailed views of the protective cap in accordance with FIG. 9.

FIG. 11 shows a sectional view of the protective cap and of the hydraulic regulator with an installed protective cap.

DETAILED DESCRIPTION

Figure 1:
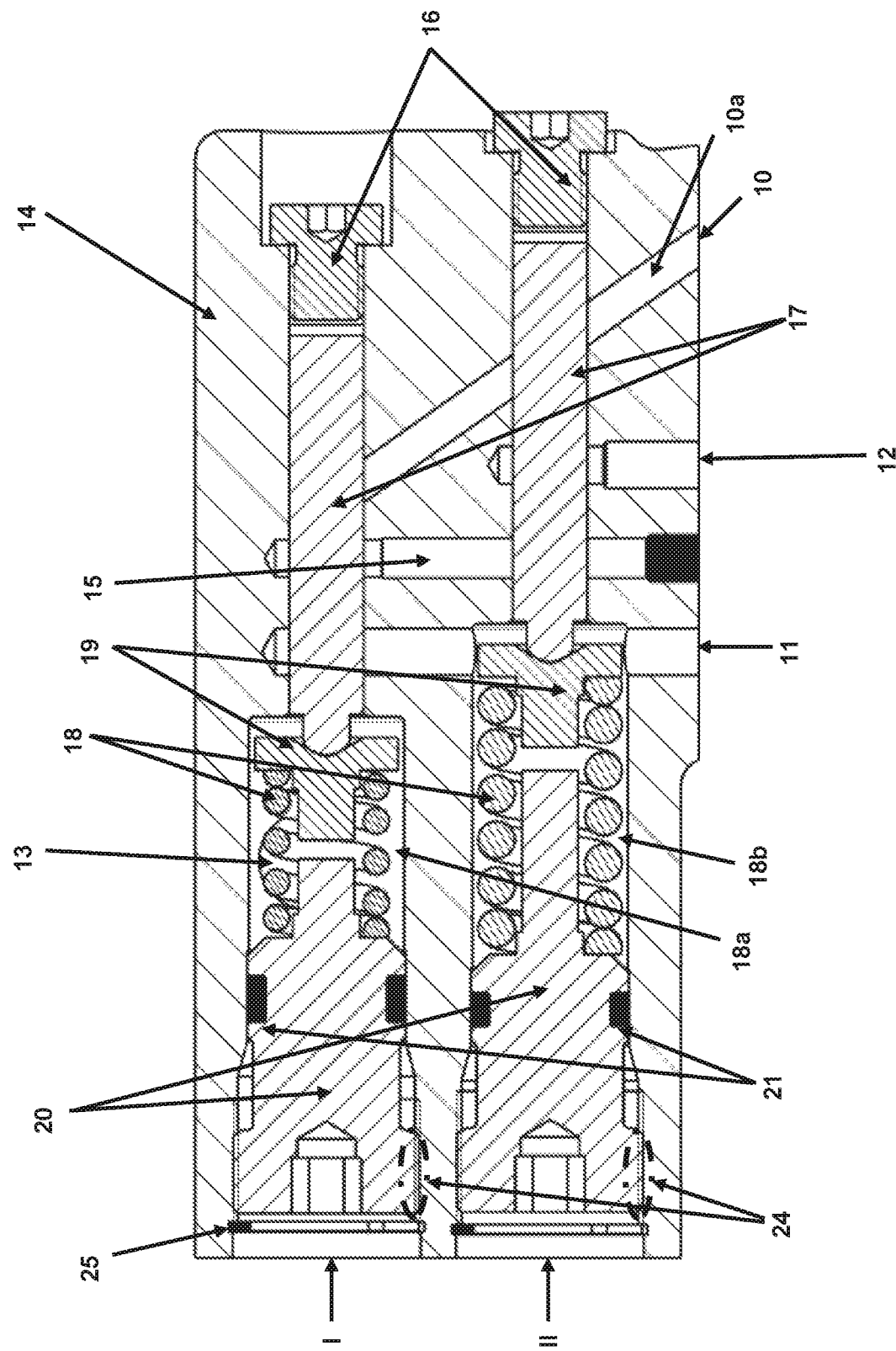
FIG. 1 shows a sectional representation of the hydraulic apparatus in accordance with the invention in the form of a two-stage hydraulic regulator of which each stage is equipped with a regulator closure screw in accordance with the invention.
Figure 2:
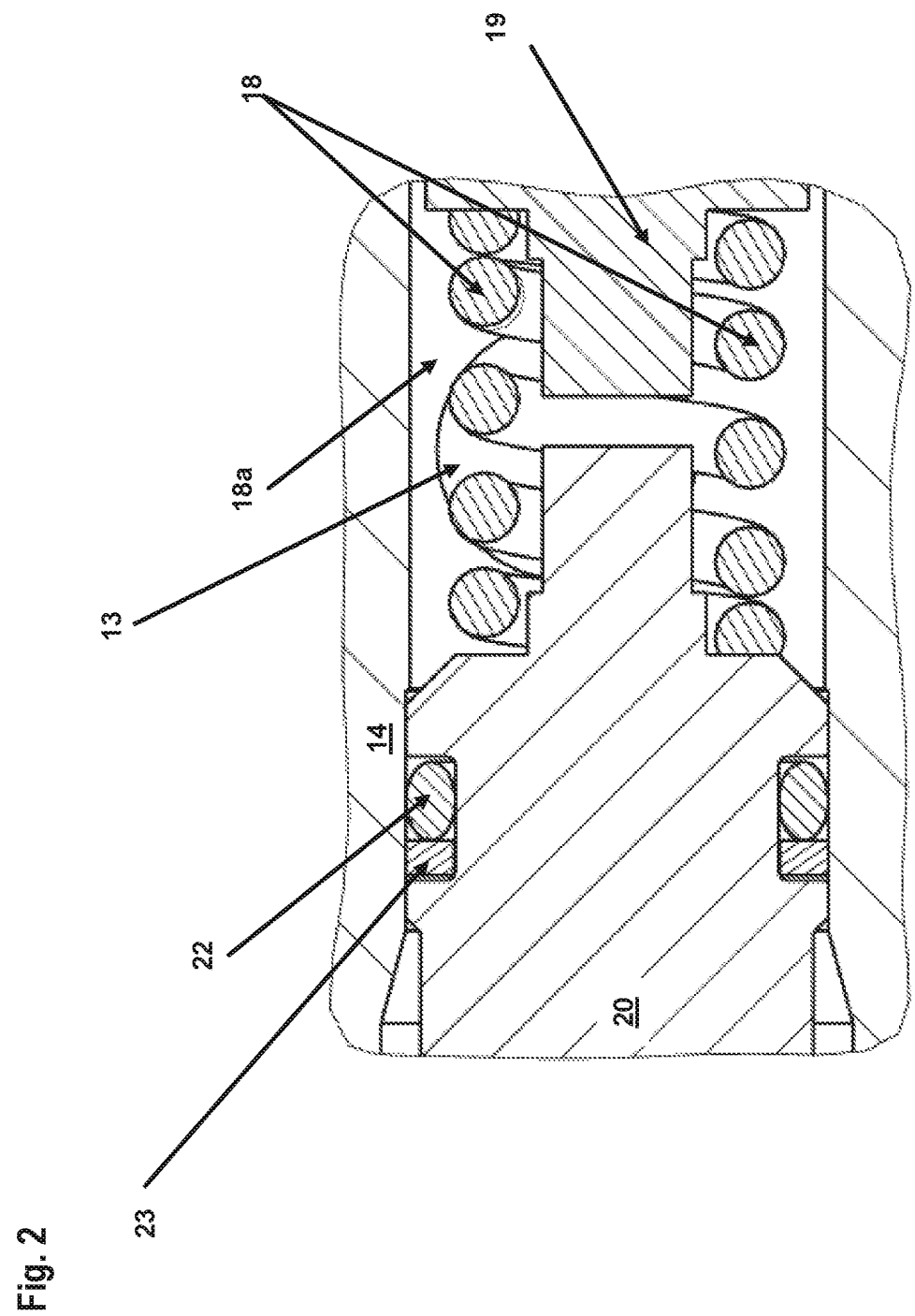
FIG. 2 shows a detailed view of the hydraulic regulator of FIG. 1.

The hydraulic apparatus in accordance with the invention will be presented in the following with reference to an embodiment shown in FIGS. 1 to 4, wherein it is a hydraulic regulator having a load sensing regulator I and a pressure cut off II that are located in a common housing 14. The explanation of this embodiment takes place under the assumption that the hydraulic regulator is used to actuate the regulating apparatus of a hydraulic pump. The hydraulic regulator has four outer connectors 10, 11, 12, 13 to provide oil connections, namely the connector 10 to the high pressure output of the hydraulic pump to be regulated, the connector 11 to the tank return, a connector 12 to the regulating apparatus of the hydraulic pump, and a connector 13 for the supply of the external control pressure. The load sensing regulator I and the pressure cut off II are here connected to one another via a common bore 15 that is sealed to the outside.

Both regulator axles, i.e. that of the load sensing regulator I and that of the pressure cut off II, are equipped with the following components from right to left with respect to the arrangements selected in FIG. 1. A closure system 16 that is oil-tight even at the maximum possible pressure level in the high pressure bore 10a. A piston 17 having two corresponding sectionally present annular cutouts along its jacket surface (not shown in FIG. 1) so that the required oil connections are present both within the regulator and also to the outer connectors 10-13 in dependence on the longitudinal position of the piston 17. A compression spring 18 having a support system 19 of the piston end. (The support system 19 can, for example, be designed as a spring plate and the compression spring 18 can, for example, be designed as a helical spring. Alternatively to this, a compression spring-support system can also be built up by a stringing together of plate springs.)

A regulating screw 20 for preloading the compression spring 18 having a prolongation serving as a spring plate. A closure system that has to be sealing up to the maximum possible oil pressure level in the spring chamber 18a. The closure is formed by the regulating screw 20, i.e. the regulating and closure screw 20 is in one part.

In accordance with the invention, an advantageous limitation of the possible adjustment range of the minimal and maximum preload of the compression spring 18 is provided and thus an advantageous limitation of the possible adjustment range of the pressure cut off for the connected hydraulic pump. In most applications of a hydraulic regulator, the highest pressure levels can occur at the high pressure output of the hydraulic pump at the maximum possible preload of the compression spring 18. The maximum possible value of this pressure level is smaller with a weaker preload of the compression spring 18. A use of the regulator in which a reverse connection between the preload of the compressing spring 18 and the pressure level that is present at the high pressure output 10 of the hydraulic pump is possible, but is not looked at further in the following text.

Abutment to limit the minimal preload of the compression spring 18

In the spring chamber 18a of the load sensing regulator I, the screw connection between the regulator housing 14 and the regulator closure screw 20 has to be sealing toward the maximum possible pressure level of the control pressure that is supplied via the connector 13 and that can be at some 10 bar in practice. A support ring 23 is placed into the groove 21 accommodating the O ring 22 serving as a sealing element (cf. the detail view of FIG. 2). At a correspondingly high control pressure, the O ring 22 is pressed against the support ring 23, whereby the load sensing regulator I remains pressure-tight.

The O ring 22 can also be combined with a support ring 23 to maintain a strategy of the same parts in the pressure cut off II. The sole use of an O ring 22 at the regulator closure screw 20 is sufficient here for sealing because low pressure is always present in the volume to be hereby sealed. There is either a sole oil connection from this volume 18b to the tank return via the connector 12 or there is only a small excess pressure of approximately 1 to 2 bar in this volume 18b, and indeed when a backflow of hydraulic oil takes place due to the position of the control spool 17 from the connector 12, coming from the adjustment apparatus (i.e. from the regulator cylinder), into the tank return.

A so-called demand flow regulation of the hydraulic pump is achieved by the use of a load sensing regulator I. It is avoided by such a regulator while aiming for an energy saving that the hydraulic pump unnecessarily builds up a high pressure level in the hydraulic oil circuit in those operating phases in which the hydraulic consumers only require small volume flows. The setting of a load sensing pressure that is as small as possible is advantageous under the aspect of energy efficiency. However, an operation in that region of low pressures has to be avoided in which the regulator does not work reliably (approximately below 10 bar). A load sensing regulator therefore has an end abutment position beyond which no further lowering of the load sensing pressure is possible, the so-called pmin abutment. In specific applications such as winch drives a certain pressure reserve has to be present so that here the load sensing pressure is set to some tens bars (up to 60 bar). The availability of pmax abutment is sensible so that the setting of the load sensing pressure to an unnecessarily high value is avoided. The setting of the load sensing pressure is clearly adapted to the requirements of the hydraulic system and to the application.

The maximum pressure level possible at the high pressure output of a hydraulic pump is limited by the use of a pressure cut off II to regulate said hydraulic pump, which serves to avoid an overload of the hydraulic system including the hydraulic pump itself. Unlike a pressure relief valve that leads off the excess power via a bypass and thus ultimately converts some of the hydraulic power provided by the hydraulic pump into the heating of hydraulic oil, the pressure cut off acts on the regulating device of the hydraulic pump such that the so-called cut off pressure cannot be exceeded. No stable regulation is possible at pressure levels that are too low. A cut off pressure set to a very small pressure level would furthermore prevent the leakage required for lubrication. A pmin abutment is also sensible for a pressure cut off for said reasons.

In the embodiment of the installed regulator shown in FIGS. 1 to 4, the narrow end of the regulator adjustment screw 20 projects axially centrally into the helical spring 18. The regulator closure screw 20 has a larger diameter in its prolongation. A particularly clear increase of the outer diameter of the regulator closure screw 20 is present at a specific longitudinal section thereof. There is a surface there that is aligned perpendicular to the imaginary axis of the regulator closure screw 20 on which the latter is supported on the compression spring 18 designed as a helical spring (cf. FIG. 1). This support surface can also be conical or curved (convex or concave). The use of a different spring element instead of a helical spring 18 is also possible, for instance a stringing together of individual plate springs.

In an optional embodiment, the regulator closure screw 20 is not supported directly at the compression spring 18, but rather via a washer inserted therebetween. In this case, a hardened washer is particularly preferably used. Generally, a helical spring 18 will scrape at its support surface during use and could lead to material abrasion over the period of use. A chip formation has to be avoided in all cases since abraded material would enter into the oil circuit and could result in consequential damage. The support surface therefore has to be hardened. The design of a completely hardened or partially hardened regulator adjustment screw 20 is naturally considerably more expensive than the use of a hardened washer.

The longitudinal sections along which the regulator closure screw 20 is located with tight contact to the inner surface of its reception bore in the regulator housing 14 are designed as follows: Adjacent to the groove 21 present to accommodate said sealing element, there is a respective longitudinal section of the regulator closure screw 20 in which its outer diameter almost has the dimension of the oppositely disposed inner diameter of the housing bore in the regulator housing 14. An external thread 24 is located in the end region of the regulator adjustment screw 20 where its largest diameter is present. The region of the housing bore in the regulator housing 14 opposite thereto has an internal thread matching it that extends from the radial groove 25 still to be described later in the axial direction up to a section from which the diameter of the housing bore constantly tapers. In the embodiment in accordance with FIGS. 1 to 4, the number of threads within the housing bore is larger than that of the regulator closure screw 20; however, this is not absolutely necessary. With respect to this threaded connection, such a matching between the regulator closure screw 20 and is housing bore in the regulator housing 14 is required that respectively enables the setting of the required spring preloads for the different applications of the load sensing regulator and of the stage for the pressure cut off.

In an advantageous embodiment, the regulator closure screw 20 is located completely within the regulator housing 14 over its total regulating range and a provided securing mechanism that prevents the regulator closure screw 20 from being removed simply by turning and thus from being removed accidentally is here mounted after the insertion of the regulator closure screw 20 in its installed position on the assembly of the regulator. In the shown and preferred embodiment, this can be done by a radial groove 25 that is worked into the wall of the housing bore of the regulator housing 14 along the section of the housing bore that is located outside the installation space of the regulator closure screw 20. A shaft securing ring 26 (see FIG. 3) can be introduced into this radial groove 25. The complete unscrewing of the regulator closure screw 20 is clearly only possible by a previous removal of the shaft securing ring 26. Without a removal of the shaft securing ring 26, the latter forms an abutment or an end position on the unscrewing of the regulator closure screw 20.

The radial groove 25 and thus the shaft securing ring 26 are ideally located at exactly that position so that on the presence of the end position in which the head of the regulator closure screw 20 abuts the shaft securing ring 26 the minimal permitted preload of the compression spring 18 results. At this setting, the set cut off pressure is at the still permitted minimal value. A minimal value of the preload of the compression spring 18 results by the configuration of the position of the shaft securing ring 26 or of its support surface facing the interior of the regulator housing 14, of the spacing along the regulator closure screw 20 between the support surface to the shaft securing ring 26 up to the support surface of the compression spring 18, of the spring length of the relaxed compression spring 18, of its spring rate, of the plate thickness of the spring plate 19, and of the end position of the spring plate 19 at the piston side.

In an advantageous embodiment, the two support surfaces at which the compression spring 18 is supported are particularly wear-resistant, e.g. due to the hardening or coating of the one-part regulator closure screw 20 or of the spring plate 19 or of both parts. In an alternative embodiment, a separate spring plate is present instead of a prolongation on the one-part regulator closure screw 20. In a particularly advantageous embodiment, only the support surfaces at which the compression spring 18 is supported are hardened or coated. In a particularly advantageous embodiment, said more complex components are not hardened or coated, but the support surfaces at which the compression spring 18 is supported are represented by hardened washers that have been placed on. In a very particularly preferred embodiment, they are hardened washers in standard dimensions.

If, starting from a specific regulator configuration, a change should be made to the extent that the smallest possible setting value of the minimal spring preload is to be raised and that the setting value of the maximum possible spring preload remains unchanged, a regulator closure screw 20 can, for example, be used having a longer screw head or a regulator closure screw at whose head end a prolongation is located. Alternatively, the radial inner groove provided for receiving the shaft securing ring in the housing bore can be introduced at a greater depth, i.e. closer to the spring chamber. With this objective, a washer or a stack of a plurality of washers having an adapted total thickness is preferably placed between the regulator closure screw 20 and the shaft securing ring 26. No hardened washers are required at the installation location there; an embodiment of plastic is rather also possible for this purpose.

If, starting from a specific regulator configuration, a change should be made to the extent that the smallest possible setting valve of the minimal spring preload should be lowered and that the setting value of the maximum possible spring preload remains unchanged, the opposite steps can be carried out; a shortening of the screw head of the regulator closure screw 20, if sufficient threads are available for this purpose, or a reduction of the length of the prolongation present at the screw head. Alternatively, the radial inner groove provided for receiving the shaft securing ring in the housing bore can be introduced at a lower depth. If a stack of at least one washer is present between the regulator closure screw 20 and the shaft securing ring 26, its total thickness can be reduced.

If, starting from a specific regulator configuration without reworking of the regulator housing, a change of the bandwidth should be required between the smallest possible settable spring preload and the highest possible settable spring preload, there are also different implementations here. Since the displacement of this bandwidth toward smaller spring preloads in each case counteracts measures such as for an increase of this bandwidth, the explanations are restricted to the latter. A greater preload and a higher return force is achieved in that a longer spring having the same spring hardness is used. Alternatively, such a change would also be possible by means of such a conversion that results in an end position of the spring plate 19 located at a smaller spacing from the regulator closure screw 20 (a piston 17 that extends further into the spring chamber 18a with respect to its hydraulic control function with the same regulator position or the use of a spring plate 19 having a correspondingly thicker marginal thickness, etc.).

As a further alternative, a regulator closure screw could be used whose longitudinal section has a greater dimension between the groove 21 for receiving the sealing system 22, 23 and the support surface of the compression spring 18.

Washers are preferably used with respect to these four possibilities of achieving a shift of the bandwidth between the smallest possible settable spring preload and the highest possible spring preload. The use of washers is, for example, possible between the control spool 17 and the spring plate 19, between the spring plate 19 and the compression spring 18, between the compression spring 18 and the regulator closure screw 20.

The use of a respective at least one washer between the compression spring 18 and its support surface at the regulator closure screw 20 or at the spring plate 19 or at the support surface of these two components is particularly advantageous. If washers are used in different, slightly varying thicknesses or if a plurality of very thin washers are used, the desired adaptation of the bandwidth of the preload of the compression spring 18 can be achieved. Since the surface of a washer on which the compression spring 18 lies should advantageously comprise a particularly hard material, it can be advantageous to harden a provided washer at one side. To achieve the actually required spacing, a corresponding layer thickness can be removed from the unhardened side of the prepared washer or this washer can be used in a stack having at least one further washer depending on whether the prepared washer is too thick or too thin. The use of a respective hardened washer of a standard size at each support surface of the compression spring 18 and optionally of further required washers of unhardened standard material is very particularly preferred.

With a hydraulic regulator designed as described in the preceding text, the regulator closure screw 20 can be moved within the regulation region by the provided installation tool, whereas—an accidental rotation of the regulator closure screw 20 in the direction of unpermitted lower spring preloads—the falling below of a minimal value, i.e. the falling below of a minimal pressure level at the high pressure output 10 of the operated hydraulic pump is avoided; as is a thoughtless removal of the regulator closure screw 20.

So that the installation of the regulator closure screw can be carried out, either the associated installation thread in the regulator housing 14 has to extend up to the outer end of the housing bore or the outer region of the housing bore has to be designed with a correspondingly large diameter that enables the pushing of the regulator closure screw 20 through this outer region. A longitudinal section of the housing bore closely spaced apart from the installation location of the shaft securing ring 26 at both sides is advantageously produced as a cylindrical depression whose diameter is slightly larger than the outer diameter of the thread 24. The latter facilitates the installation of the shaft securing ring 26 and avoids a deformation of the thread 24 by the shaft securing ring 26. To achieve the same advantages, the total longitudinal section within the housing bore, starting from the housing surface up to and into the longitudinal region projecting slightly beyond the installation location of the shaft securing ring 26, can have a width of the inner diameter that is slightly larger than the outer diameter of the thread 24 present for the installation of the regulator closure screw 20.

Figure 3:
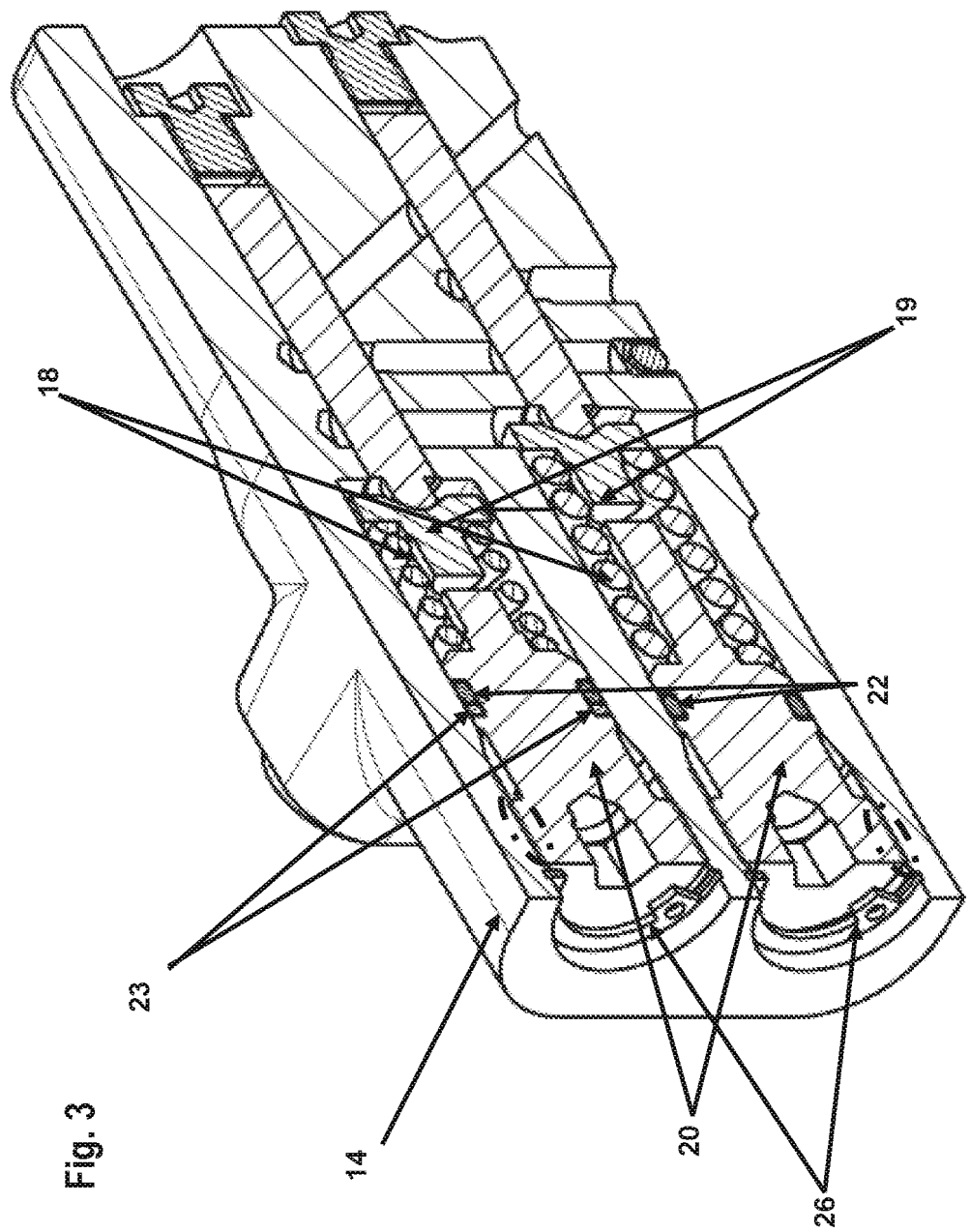
FIG. 3 shows a perspective sectional representation of the hydraulic regulator in accordance with FIG. 1.
Figure 4:
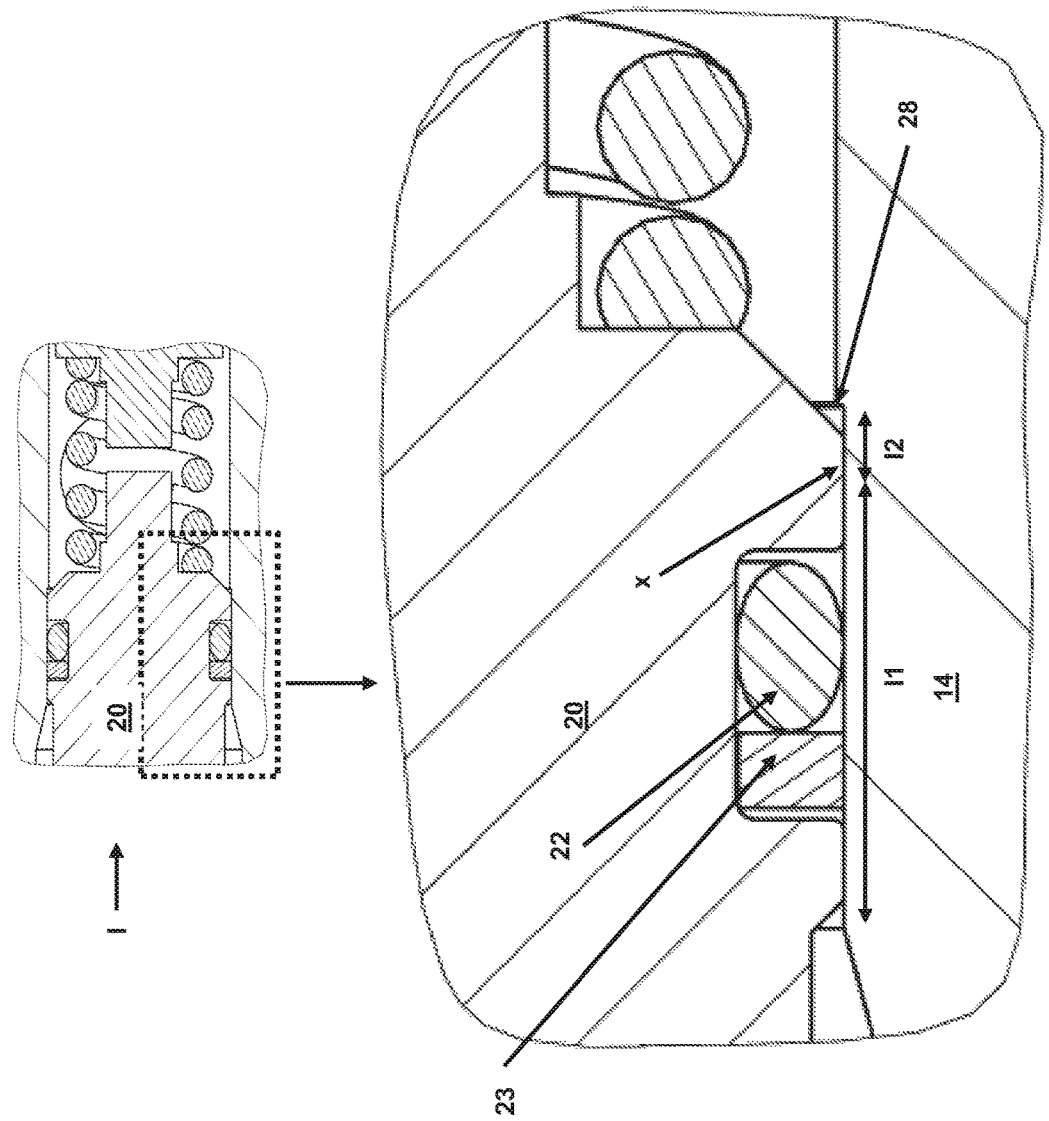
FIG. 4 shows a further detailed view of the hydraulic regulator in accordance with FIG. 1.

To place on an installation tool for actuating the regulator closure screw 20 (for the installation or for the removal and for the setting of the spring preload), there is a cutout matching the tool starting from its front face (see e.g. FIG. 3). The structure of the regulator closure screw 20 allows a plurality of possible embodiments of such cutouts. It can either be very consciously made in a standard size compatible to a standard tool (here: a hexagon socket) or it can be designed for the purpose of better protection from unauthorized interventions such that an actuation is only possible by a special tool not corresponding to any standard.

Abutment to limit the maximum preload of the helical spring

The shown embodiment of FIGS. 1 to 4 has two adjustment ranges in accordance with the invention. With reference to the application example of a load sensing regulation, the load sensing pressure level can be set within a specific bandwidth, the lower adjustment range, from the absolute minimal value up to a pressure level that is still typical for applications in which the achieving of a power loss that is as low as possible can be given absolute priority, whereas, in an adjustment range above it, a load sensing pressure level can be set for those applications for which the provision of a certain pressure reserve is necessary or advantageous.

With reference to the application example of a pressure cut off that will be maintained in the following text, the cut off pressure can be set within a specific bandwidth, the lower adjustment range, from a minimal value predefined by the pmin abutment up to the upper limit of the pressure level at which the hydraulic system can be permanently operated. The cut off pressure can be set within a bandwidth directly adjoining the former and disposed above it within a regular pressurized range up to an upper limit that can no longer be exceeded. Whether the position of the regulator closure screw 20 would cause a pressure cut off below or within the regular work range is perceived by the engineer on its movement.

To explain this innovative regulator securing mechanism, the longitudinal section of the regulator closure screw 20 installed in the regulator housing 14 will be looked at that is located in the vicinity of the O ring 23. Substantial features of this longitudinal section can be seen from FIG. 4 that shows a detailed view of the regulator of FIGS. 1 to 3.

Starting from a positioning of the regulator closure screw 20 in the regulator housing 14 at which the compression spring 18 has the minimal permitted preload or a slightly higher preload, the longitudinal section of the jacket surface of the regulator closure screw 20 that is disposed on the right of the O ring 23 is located at the oppositely disposed wall section I1 of the housing bore of the regulator housing 14, where there is an inner diameter of a size D1. Due to the comparatively large spacing there, there is initially no friction within this longitudinal section on a continued screwing of the regulator closure screw 20 into the regulator housing 14. Friction between the regulator closure screw 20 and the regulator housing 14 occurs at the threaded connection 24 and in the regions of the O ring 22, of the optionally present support ring 23, and at the optionally present washers. A certain degree of friction is necessary since the regulator closure screw 20 would otherwise adjust itself independently. To avoid the automatic adjustment—for instance due to vibrations occurring during use—the regulator closure screw 20 is fixed by a clamping screw that is provided with a continuous threaded bore, for example at a corresponding point of the regulator housing 14 and abuts a cylindrical section of the regulator closure screw 20. With a released clamping screw, the regulator closure screw 20 can be set within a certain bandwidth. Depending on the setting, the pressure level is fixed that can be present as a maximum at the high pressure output 10 of the hydraulic pump with a correspondingly sufficient mechanical input power. As mentioned, this limitation present at a hydraulic regulator is called a pressure cut off. The so-called cut off pressure can be adjusted within a specific bandwidth.

To avoid damage, the bandwidth of the cut off pressure should be adjusted only in that range in which the hydraulic pump or a hydraulic motor or a hydraulic system can be permanently operator. To avoid damage and to prevent danger, the cut off pressure may not be above a critical value.

The housing bore present to receive the regulator closure screw 20 in the regulator housing 14 has a longitudinal section 12 adjacent to the longitudinal section 11. A change of the inner diameter from D1 to D2 takes place at the transition region of these two longitudinal sections 11,12, with the inner diameter D2 present in the longitudinal section 12 being slightly smaller than the diameter D1. In this respect, the inner diameter D1 is matched to the outer diameter Dx of the regulator closure screw 20 that it has in the longitudinal section x such that, with a regulator closure screw 20 screwed in correspondingly far that results in an overlap of the longitudinal section x of the regulator closure screw 20 and of the longitudinal section 12 of the housing bore, a press fit is present in this overlap region in the regulator housing.

If such an overlap and thus said press fit are present, a higher torque has to be applied to screw the regulator closure screw 20 in and to unscrew it. It is achieved by a corresponding dimensioning of the diameters D1 and Dx and by a corresponding quality of the affected surfaces that the regulator closure screw 20 can be moved within this overlap region with a force effort to be applied to the installation tool that can still be managed without problem, but is still noticeably higher.

A considerable tapering of the inner diameter of the housing bore of the regulator housing 14 is present at the end of the longitudinal region 12 facing the compression spring 18. The tapering region forms an abutment at which the regulator closure screw 20 ultimately abuts when it is screwed further into the regulator housing 14, starting from the overlap region. An increased abutment surface 28 is present due to a correspondingly mutually matched chamfer to be recognized in FIG. 4 on the reaching of this second and simultaneously final/hard impact on the coming together of the regulator closure screw 20 and the housing bore in the regulator housing 20, whereby a higher stability of the abutment is achieved. The risk is considerably counteracted that the edge of the regulator closure screw 20 impacting the abutment generally scrapes into the abutment and the risks associated therewith of material abrasion entering into the oil circuit and an unwanted shift of the final abutment position become substantially less likely.

In a preferred embodiment, without counteracting the preceding features by a design that is advantageous with respect to production and function to achieve protection from a negligent removal of the regulator closure screw and a limitation of the minimal pressure level, the affected regulator components are dimensioned such that the regulator closure screw 20 is in the overlap region when the pressure cut off fixed by its position there takes place at an admittedly already high pressure level, with the presence of such a pressure level at the high pressure output 10 of the hydraulic pump being smaller than a pressure on whose reaching the risk of instantaneous damage or even of an immediate destruction of the hydraulic pump is present. An operation of the hydraulic pump with a longer duration would nevertheless shorten the service life at the particularly high pressure. It follows from the previously described features that in this preferred embodiment, while maintaining the above, the chamfered abutment surfaces 28 of the regulator closure screw 20 and of the housing bore of the regulator housing 14 should impact one another, in which such a preload of the compression spring 18 is present that results in a pressure cut off that is in every case below a critical value on whose exceeding damage would occur to the hydraulic pump that would be too great.

Optical monitoring of the set pressure cut off

A further aspect of the invention relates to a design for the optical monitoring of the set preload of the control spool spring in an apparatus of the category. The designs explained in the following can be used detached from the previously presented embodiment of FIGS. 1 to 4 in hydraulic apparatus of the category, but can also be easily integrated into the design of FIGS. 1 to 4.

It is desirable to provide an optical and haptic monitoring option for the set spring preload for the above-described embodiments for setting the load sensing pressure and the pressure cut off. The haptic monitoring is a great advantage because in specific installation situations during such service work to be carried out at the deployment site, the micrometer screw may not be recognizable, but can by all means be touchable, for instance on the use of hydraulic components in mobile work machines. Such an assembly for optical and haptic monitoring will be presented in the following in three different configuration levels—called types A, B, and C. All the types presented can be combined with the known embodiment of FIGS. 1 to 4.

The assembly described in the following for the optical and haptic setting monitoring can furthermore generally be used for setting hydraulic regulators and hydraulic valves. The explanation of the structure and of the operation takes place for the example of the setting of a pressure cut off.

Figure 5:
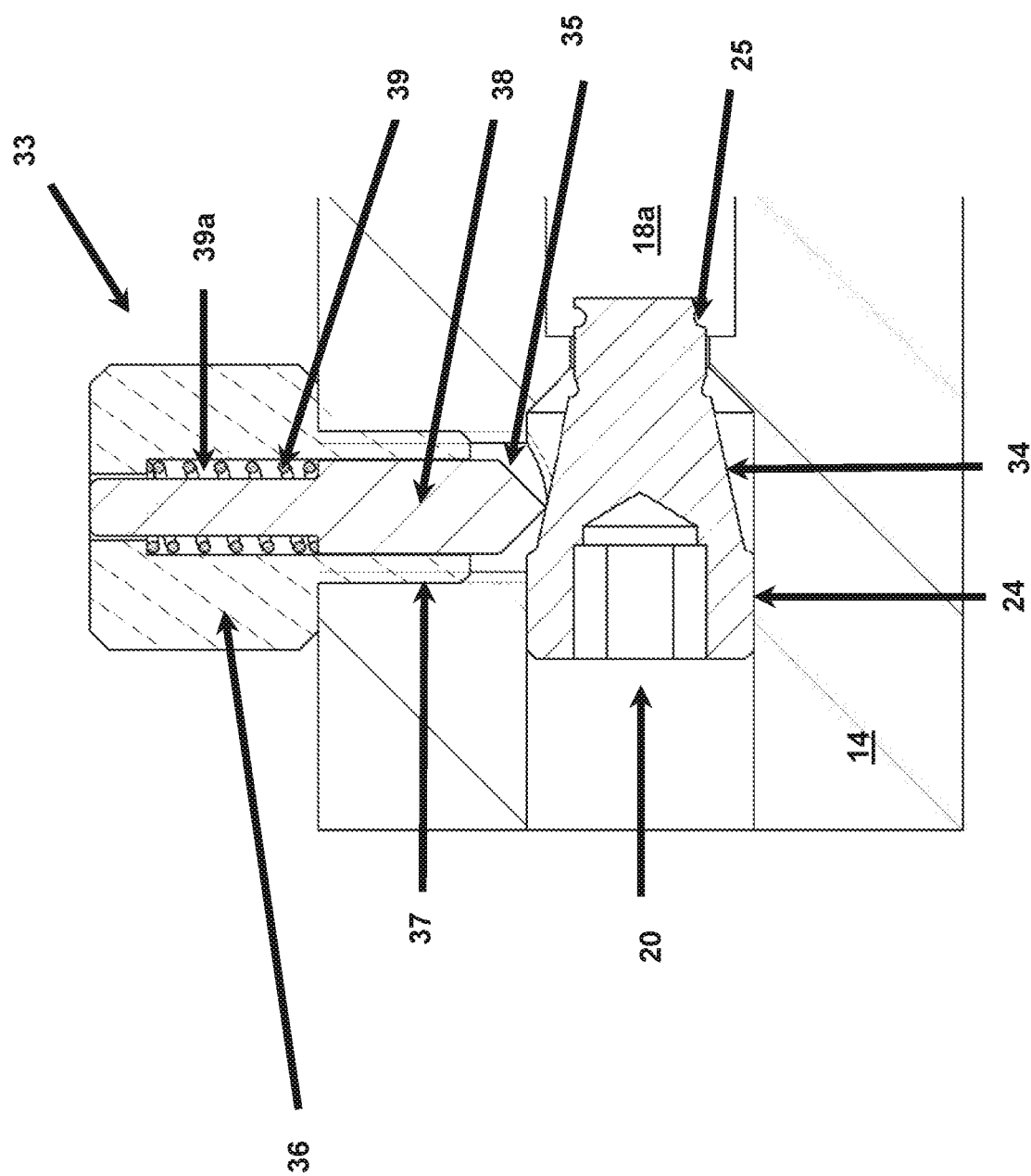
FIG. 5 shows a sectional representation of the optical and haptic monitoring component in accordance with the invention in accordance with a first embodiment (type A).

Assembly for the optical monitoring of the set pressure cut off according to Type A FIG. 5 shows a partial view of the longitudinal hydraulic regulator section in the proximity of the one-part regulator closure screw 20. Its right end projects into the spring chamber 18a belonging to the regulator axle. A threaded connection 24 is present between the regulator closure screw 20 and the regulator housing 14 at the left side, at the head end of the regulator closure screw 20.

Unlike the previously considered embodiment, a functionally induced tapering jacket surface 34, preferably of conical shape, is present within a comparatively widely extended specific longitudinal section with the regulator closure screw 20 observed here. A further bore 35 that intersects the housing bore serving the reception of the regulator closure screw 20 is present in the regulator housing 14. A micrometer screw 33 is fastened in this bore 35 provided with a thread 37. It is a bolt and nut 36 here that in turn comprises a pin 38 along a continuous axial recess and a chamber 39a equipped with a compression spring 39. Depending on the screw-in depth of the regulator closure screw 20, a position of the pin 38 or of the lower tip of the pin 38 guided in its bolt and nut 36, lying on the cone 34, and pressed on there by the compression spring 39 results from the defined pitch of the conical shape 34 of said regulator closure screw 20

The considered components can be designed with regard to the respective mass such that the provided desired value of the pressure cut off is present at exactly that screw-in depth of the regulator closure screw 20 at which the upper front face of the pin 38 terminates in a planar fashion with the upper side of the bolt and nut 36. If different pressure cut offs have to be set for different models of a hydraulic regulator or if, so-to-say, the pressure cut off of a hydraulic regulator has to be set to a different value, a correspondingly differently dimensioned micrometer screw can be used whose basic design is the same.

It applies to all the shown assembly embodiments of the optical and haptic monitoring of the set pressure cut off:

It must be pointed out that the illustrations in FIGS. 5 to 8 are always simplified representations from which the functionalities can be recognized that are delineated from the prior art, on the one hand, and from the inventive system solutions already presented in the preceding text. Such details that are necessary for an implementation, but are not to be considered inventive, will not be shown in such a depth as a production drawing requires in the slides. In a real implementation of the hydraulic regulator shown in FIG. 5, for instance, an oil seal is required between the regulator housing 14 and the regulator closure screw 20 in the transition region of the spring chamber 18a belonging to the regulator axle and the section of the housing bore in the regulator housing 14 in which the conical region 34 of the regulator closure screw 20 is located.

The mechanism shown in FIG. 5, i.e. the equipping of a hydraulic regulator or of a hydraulic valve with a Type A assembly, can be used in combination with the already presented hydraulic apparatus in accordance with FIGS. 1 to 4 by which the setting of a pressure cut off II, the setting of a load sensing regulator I, or the setting of an opening pressure of a pressure relief valve, etc. are simplified.

These combination possibilities furthermore apply to the Type B and C configuration levels explained in the following.

In the representation in the form of a technical drawing, all three different configuration levels of Type A, B, and C of the assembly for the optical and haptic monitoring of the set pressure cut off have (almost) the same outer view shown in FIG. 6. Due to the presence of a compression spring 39 in the spring chamber 39a within the bolt and nut 36, the upper pin end in a removed micrometer screw 33 respectively belonging to the assemblies in accordance with configuration levels A and B is located in the interior of the bolt and nut 36 and not projecting from the head of the bolt and nut 36 as can be recognized in the right hand representation of FIG. 6.

Figure 7:
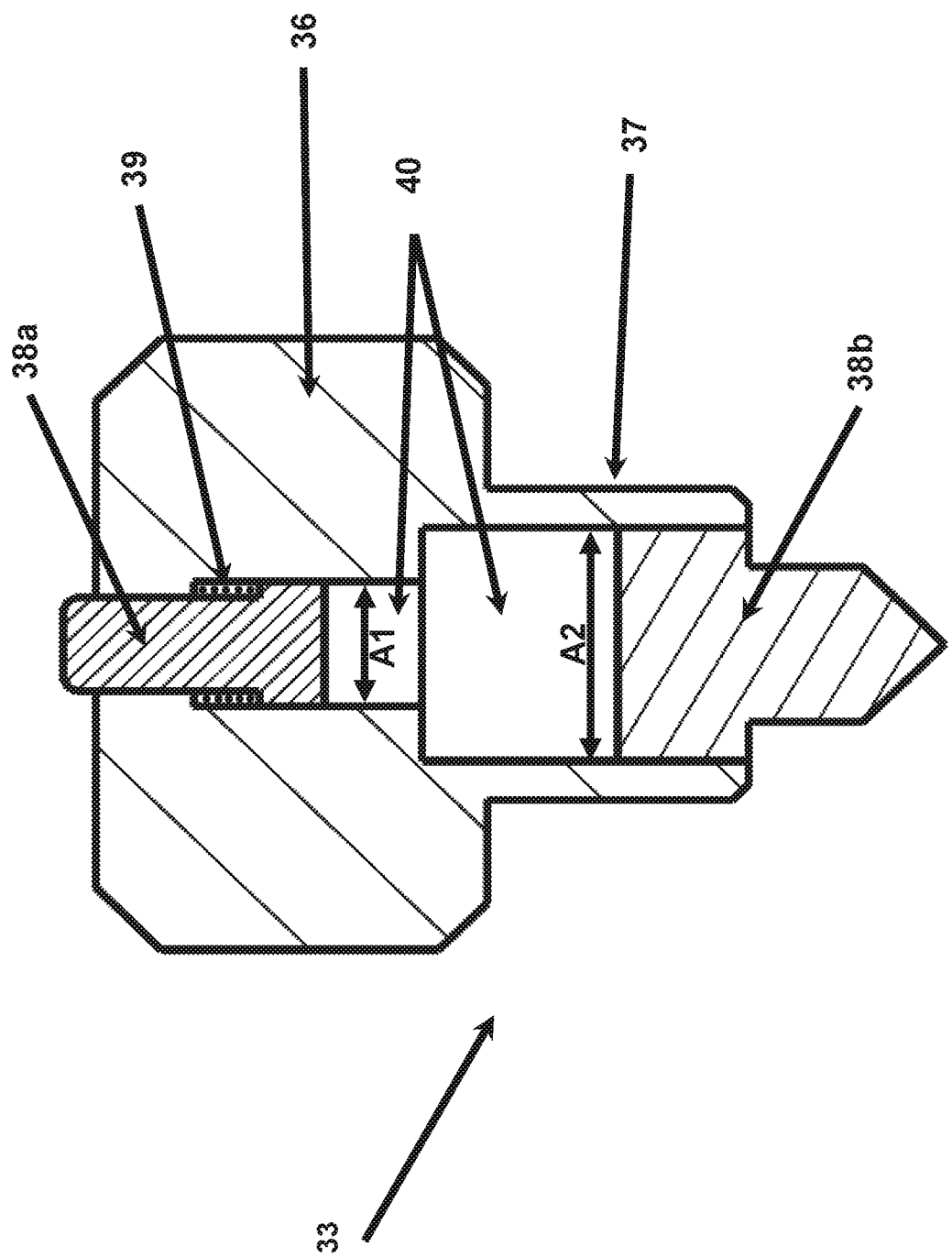
FIG. 7 shows a sectional representation of the optical and haptic monitoring component in accordance with the invention in accordance with a second embodiment (type B).

Assembly for the optical monitoring of the set pressure cut off according to Type B The micrometer screw 33 in accordance with FIG. 7 belonging to such a Type B comprises a bolt and nut 36 in whose axial cutout a regulating pin 38a and a visible pin 38b are accommodated. There is a sealed volume 40 filled with fluid between these two pins in this cutout. Due to the shape of the visible pin 38a and the longitudinal section of the bolt and nut 36 accommodating it, there is a free space with an installed compression spring 39 that presses the visible pin 38a in the direction of the regulating pin 38b. If the assembly shown here is installed according to its intended purpose in a hydraulic regulator, the regulating pin 38b exerts a pressure on the enclosed fluid in the volume 40. In accordance with the present cross-sectional surfaces A1 and A2, a movement of the regulating pin 38b by a length l2 causes a movement in the visible pin of a length l1=l2*A2/A1.

A correspondingly selected surface ratio of A1 and A2 effects a large movement of the visible pin 38a on just a small movement of the regulating pin 38b—i.e. a small adjustment of the regulator closure screw 20. Consequently, a much more precise setting of the pressure cut off can be achieved on the use of such a Type B assembly.

Figure 8:
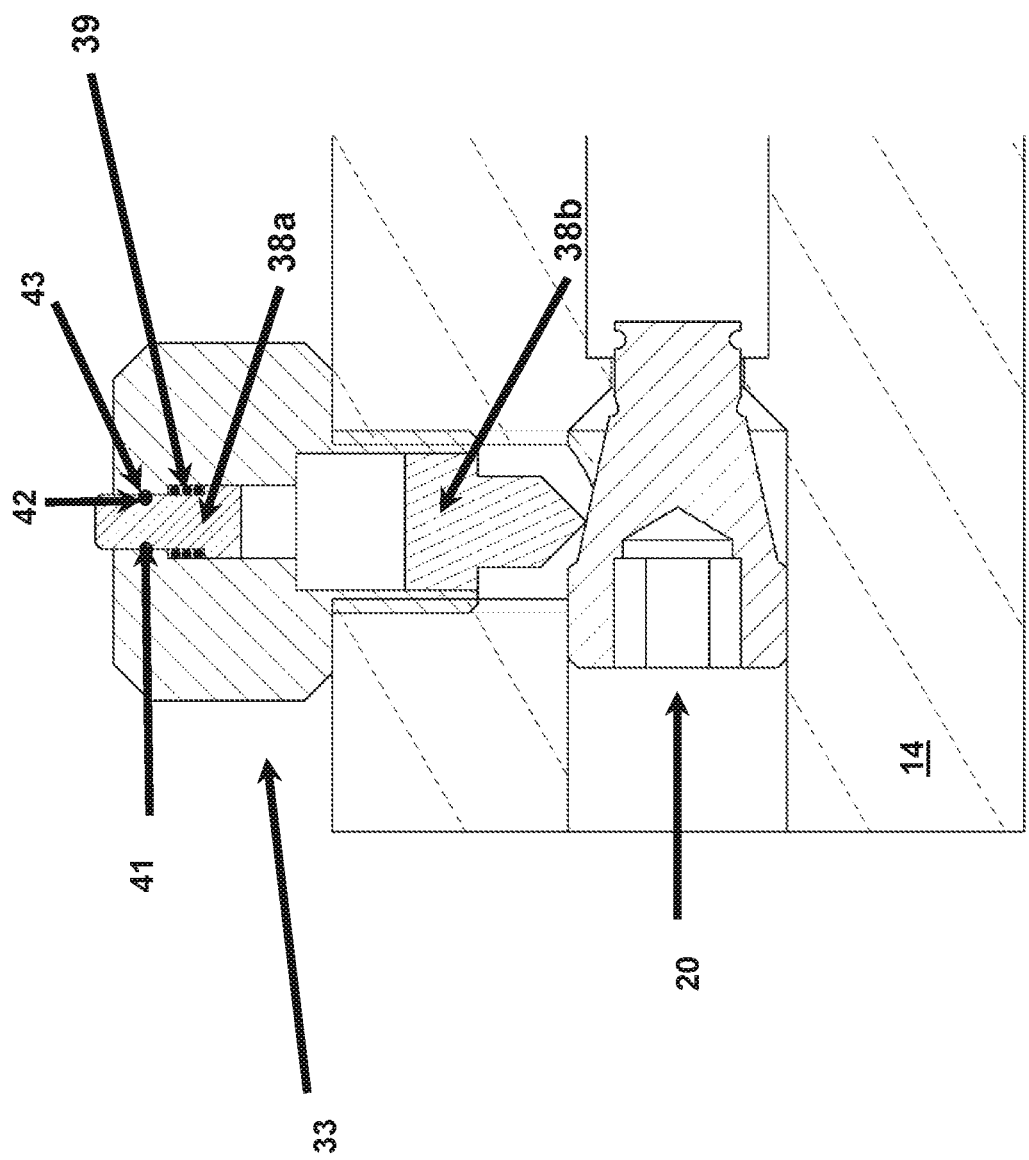
FIG. 8 shows a sectional representation of the optical and haptic monitoring component in accordance with the invention in accordance with a third embodiment (type C).

Assembly for the optical monitoring of the set pressure cut off according to Type C In its basic design and its basic function, a Type C assembly corresponds to one of Type B, but has as an expansion a latch-in function by means of which it is recognized whether the cut off pressure of the regulator or of the valve has been set above the permitted maximum value. This expansion is shown in FIG. 8. The visible pin 38a can be introduced into the bore of the bolt and nut 36 and can be axially moved within a specific range therein with a placed on shaft securing ring 42 completely pressed into its radial groove 41.

The bolt and nut 36 used in Type C likewise has a radial groove 43 adapted to said shaft securing ring 42 within its axial bore. If the regulating pin 38b and thus also the visible pin 38a are moved so far in the direction of the upper head end of the bolt and nut 36, the shaft securing ring 42 placed on at the visible pin 38a reaches the radial groove 43 located in the bolt and nut 36. This in turn has the result with the embodiments of the radial grooves 41, 43 and those of the shaft securing ring 42 (as well as those of the compression spring 39) in accordance with their intended purposes that the shaft securing ring 42 latches in the radial groove 43 of the bolt and nut 36 and at the same time still remains locked in the radial groove 41 of the visible pin 38a. As a consequence thereof, the positions of the two pins 38a, 38b are maintained within the bolt and nut 36.

Since the components involved in the latching function are in turn designed in accordance with the intended purpose, it can be achieved that this irreversible latching takes place when the permitted maximum value is exceeded on the setting of the pressure cut off, i.e. expressed mathematically and thus more exactly in words, when it has assumed a non-permitted high limit value. So that it can thus be precluded that it is not, for instance, the micrometer screw that has been removed and that the pressure cut off has here been set to a non-permitted high limit value, a provision has to be taken to avoid a dismantling of the micrometer screw or a measure has to be taken that allows a removal to be subsequently recognized. An advantageous provision is represented by a threaded connection 37 designed with a predetermined breaking point between the regulator housing 14 and the micrometer screw 33. The use of a Type C assembly is clearly advantageous in those arrangements in which the exceeding of a maximum value is particularly critical.

It can clearly not be checked by the latching function whether the hydraulic system has actually been operated at the unpermitted high pressure.

Protective Cap/Dual Protective Cap

In a configuration level, a protective cap can be used both for a hydraulic regulator in accordance with the prior art and for a hydraulic regulator in accordance with the invention; and equally for a hydraulic valve corresponding to the prior art or in accordance with the invention. The use of a component designated as a protective cap and, in the case of a two-stage regulator, as a dual protective cap 50, and explained in more detail in the following text is above all proposed for the hydraulic regulators configured in the preferred variant. An embodiment of the dual protective cap 50 is shown in FIGS. 9-11. FIG. 9 shows the regulator housing 14 having an installed dual protective cap; FIG. 10 shows the upper side and lower side of the dual protective cap 50 in two illustrations. FIG. 11 shows a sectional representation of the protective cap 50 and of the regulator housing 14 with an installed dual protective cap 50.

The dual protective cap 50 can be placed on in production as soon as the shaft securing rings 26 have been mounted. The regulator also remains fully functional without being equipped with a dual protective cap 50. The region of the housing bore in the regulator housing 14 outside the regulator closure screw 20—together with the threads 24 provided there, the installed shaft securing rings 26, and the recesses of the regulator closure screw 20 at the head side to which the installation tool has to be applied—can be covered by means of the dual protective cap 50 to protect said region from damage and from a penetration of dust and other contaminants.

The dual protective cap 50 is equipped with corresponding claws 51 that latch into complementary cutouts at the regulator housing 14 by a slight pressing in with a correctly positioned placement. In addition, cutouts 53 can be provided at the cap 50 or at the claws 51 to increase the flexibility of the cap 50 and to simplify installation. A plastic suitable for the conditions of use, e.g. PVC, is advantageous as a material for the production of the dual protective caps 50. In an advantageous embodiment, the removal of a dual protective cap necessarily results in its intended destruction. An availability of such dual protective caps 50 in different colors is particularly advantageous. It is then possible to equip the regulators with a respective dual protective cap 50 of a color a on a factory installation. When work has taken place at the regulator by factory employees or by especially certified service engineers of other corporations, dual protective caps 50 in a color b can be used. In order not to put off potential customers by a service contract, dual protective caps 50 can be freely saleable in a color c so that corresponding hydraulic regulators can be equipped with such a one once work has been carried out by third parties at the regulator. (The latter and the continued ideas only describe the example of a possible constellation.)

In the case of particularly high safety demands, the dual protective caps 50 of colors a and b can be marked by a unique number. A note on the work previously carried out could then be prepared by the respective employee of the service network before each application of a then uniquely identifiable new dual protective cap 50 on the regulator known by its own ident number. A complete service record can then be stored centrally—as long as carried out only within a factory installation and by certified service engineers. In order in turn to prevent an unrecognized imitation of the dual protective caps 50, they can be uniquely marked by a so-called tracer.

The advantages of the invention and of the advantageous embodiments can be summarized as follows.

Instead of a simple abutment by which a single absolute maximum value of the settable pressure cut off is defined, there is a temporarily permitted overload range that is limited by a final maximum value. While a fitter/service engineer sets the pressure cut off at the regulator, it is directly noticeable whether this adjustment takes place within the specified operating range or already within the regular overload range.

Protection against damage and against the penetration of dust and other contaminants is made possible by the dual protective cap 50. The different coloring of the dual protective caps opens up a better traceability of whether the pressure cut off is set differently at a hydraulic regulator; depending on the accepted effort, this is done in different degrees up to a unique continuous service record.

A visual and haptic monitoring of the set pressure cut off provides an improved and safe handling or setting of the pressure cut off. A small adaptation of the regulator closure screw 20 and an additional bore in the regulator housing 14 and the inclusion of a micrometer screw 33 make possible an exact setting of the pressure cut off to a very specific value by an optical or haptic control. If the pressure cut off of a regulator of the same type should be set to a different value, that is, however, in turn also fixedly defined, a micrometer screw 33 can be provided for this purpose that only differs very slightly from the other micrometer screw, while no change are required at all other components of the regulator.

The desired value of the pressure cut off can be set more precisely at the object, the regulator, using an extended embodiment of the micrometer screw 33.

In yet a further extension, this micrometer screw 33 can be designed such that the setting of the pressure cut off to too high a value or to an unpermitted high value respectively remains visible.

The invention claimed is:

1. A hydraulic apparatus, comprising a housing, at least one piston axially displaceably supported in a housing bore, and a respective at least one compression spring acting on the at least one piston, wherein at least one regulating screw is externally accessible and adjustable within the housing bore to set preloads of the at least one compression spring in an axial direction, wherein an adjustment distance of the at least one regulating screw is divided into at least two adjustment ranges and torque applied for the adjustment of the regulating screw is larger in a second adjustment range than in a first adjustment range, wherein the at least one regulating screw comprises at least one non-cylindrical jacket section, wherein the at least one non-cylindrical jacket section is a conical jacket section, to which at least one pin displaceably supported perpendicular to the axial direction of the regulating screw is adjacent and positioned as an optical and/or a haptic indicator for the preload of the at least one compression spring set via the regulating screw, and wherein the at least one pin is divided into two parts comprising a visible pin and a regulating pin, with a hydraulic or pneumatic transmission being provided between the pins, the regulating pin contacting the regulating screw comprises a larger control surface than the visible pin exiting the housing or the bolt, with the visible pin being supported under a spring load at the housing or at the bolt.

2. The hydraulic apparatus of claim 1, wherein the first adjustment range is defined by an axial movement of a sliding surface of the regulating screw along a first longitudinal section of the housing bore; and where a second adjustment range is defined by the axial movement of the sliding surface along a second longitudinal section of the housing bore.

3. The hydraulic apparatus of claim 2, wherein torque applied for the adjustment of the regulating screw is determined by mechanical friction between the sliding surface of the regulating screw and the respective longitudinal section of the housing bore.

4. The hydraulic apparatus in accordance with claim 3, wherein the torque applied for the adjustment of the regulating screw is higher in one of the at least two adjustment ranges having a greater preload of the compression spring.

5. The hydraulic apparatus of claim 2, wherein the first and second longitudinal sections of the housing bore are characterized by different bore diameters, wherein the apparatus is a hydraulic valve or a hydraulic regulator.

6. The hydraulic apparatus of claim 2, wherein the torque applied for the adjustment of the regulating screw overcomes an initial friction of a threaded connection between an internal thread of the housing bore and the regulating screw or between a sealing element disposed between the regulating screw and the housing bore or washers, the sliding surface in the first adjustment range slides with decreased friction along the first longitudinal section compared to the second adjustment range, and to compress or decompress the compression spring acting on the piston, there being a press fit between the sliding surface of the regulating screw and the second longitudinal section of the housing bore in the second adjustment range.

7. The hydraulic apparatus of claim 1, wherein the second adjustment range is provided with an abutment at an end side to limit a maximum screw-in depth of the regulating screw, with the abutment preferably being configured by a shoulder-like diameter tapering of the housing bore.

8. The hydraulic apparatus of claim 7, wherein the abutment is formed by a shoulder-like tapering of an inner diameter of the housing bore, and where a diameter of the housing bore adjoining the shoulder-like tapering in a direction of a spring chamber tapers conically with the same conicity as a counter-abutment surface of the regulating screw.

9. The hydraulic apparatus of claim 8, wherein the regulating screw is directly screwed to a thread shaped in the housing bore and where the regulating screw forms a pressure-tight oil-sealing closure system to seal the spring chamber of the compression spring from an outside.

10. A hydraulic apparatus, comprising a housing, at least one piston axially displaceably supported in a housing bore, and a respective at least one compression spring acting on the at least one piston, wherein at least one regulating screw is externally accessible and adjustable within the housing bore to set a preload of the at least one compression spring in an axial direction, wherein the at least one regulating screw comprises at least one non-cylindrical jacket section, wherein the at least one non-cylindrical jacket section is a conical jacket section, to which at least one pin displaceably supported perpendicular to the axial direction of the regulating screw is adjacent and positioned as an optical and/or a haptic indicator for the preload of the at least one compression spring set via the regulating screw,
wherein the at least one pin is divided into two parts comprising a visible pin and a regulating pin, with a hydraulic or pneumatic transmission being provided between the pins, the regulating pin contacting the regulating screw comprises a larger control surface than the visible pin exiting the housing or the bolt, with the visible pin being supported under a spring load at the housing or at the bolt.

11. The hydraulic apparatus of claim 10, wherein the at least one pin is supported under a spring load at the housing of the hydraulic apparatus and where a force applied to the at least one pin by an increasing diameter of the regulating screw in the non-cylindrical jacket section counteracts the spring load, and where the at least one pin is movably supported at the housing via a bolt screwable into the housing.

12. The hydraulic apparatus of claim 11, wherein an opening is provided at an end of the bolt at an end face, and where the at least one pin exits the bolt through the opening based on the position of the regulating screw, with a desired preload of the compression spring of the apparatus corresponding to a position of the regulating screw where the pin terminates in a planar manner with the end face of the bolt.

13. A hydraulic apparatus, comprising a housing, at least one piston axially displaceably supported in a housing bore, and a respective at least one compression spring acting on the at least one piston, wherein at least one regulating screw is externally accessible and adjustable within the housing bore to set a preload of the at least one compression spring in an axial direction, wherein the at least one regulating screw comprises at least one non-cylindrical jacket section, wherein the at least one non-cylindrical jacket section is a conical jacket section, to which at least one pin displaceably supported perpendicular to the axial direction of the regulating screw is adjacent and positioned as an optical and/or a haptic indicator for the preload of the at least one compression spring set via the regulating screw,
wherein the at least one pin is divided into two parts comprising a visible pin and a regulating pin, with a hydraulic or pneumatic transmission being provided between the pins, the regulating pin contacting the regulating screw comprises a larger control surface than the visible pin exiting the housing or the bolt, with the visible pin being supported under a spring load at the housing or at the bolt, and
wherein the visible pin comprises a mechanical latching function and an irreversible latching function, with the latching functions comprising a shaft securing ring that is seated on the visible pin and that is latchable into a corresponding groove of a pin mount of the bolt.

14. The hydraulic apparatus of claim 10, wherein an adjustment distance of the at least one regulating screw is divided into at least two adjustment ranges and torque applied for the adjustment of the regulating screw is larger in a second adjustment range than in a first adjustment range.

15. The hydraulic apparatus of claim 11, wherein the at least one pin is supported under a spring load at the housing of the hydraulic apparatus and where a force applied to the at least one pin by an increasing diameter of the regulating screw in the non-cylindrical jacket section counteracts a spring force of the at least one pin, and where the at least one pin is movably supported at the housing via a bolt screwable into the housing.

16. A hydraulic apparatus, comprising a housing, at least one piston axially displaceably supported in a housing bore, and a respective at least one compression spring acting on the at least one piston, wherein at least one regulating screw is externally accessible and adjustable within the housing bore to set preloads of the at least one compression spring in an axial direction, wherein an adjustment distance of the at least one regulating screw is divided into at least two adjustment ranges and torque applied for the adjustment of the regulating screw is larger in a second adjustment range than in a first adjustment range, wherein the at least one regulating screw comprises at least one non- cylindrical jacket section, wherein the at least one non-cylindrical jacket section is a conical jacket section, to which at least one pin displaceably supported perpendicular to the axial direction of the regulating screw is adjacent and positioned as an optical and/or a haptic indicator for the preload of the at least one compression spring set via the regulating screw, wherein the at least one pin is divided into two parts comprising a visible pin and a regulating pin, with a hydraulic or pneumatic transmission being provided between the pins, the regulating pin contacting the regulating screw comprises a larger control surface than the visible pin exiting the housing or the bolt, with the visible pin being supported under a spring load at the housing or at the bolt, and wherein the visible pin comprises a mechanical latching function and an irreversible latching function, with the latching functions comprising a shaft securing ring that is seated on the visible pin and that is latchable into a corresponding groove of a pin mount of the bolt.

17. The hydraulic apparatus of claim 13, wherein an opening is provided at an end of the bolt at an end face, and where the at least one pin exits the bolt through the opening based on a position of the regulating screw, with a desired preload of the compression spring of the apparatus corresponding to a position of the regulating screw where the pin terminates in a planar manner with the end face of the bolt.

* * * * *